(No Model.)
D. McDONALD.
PROPORTIONAL FLUID METER.
No. 475,596. Patented May 24, 1892.
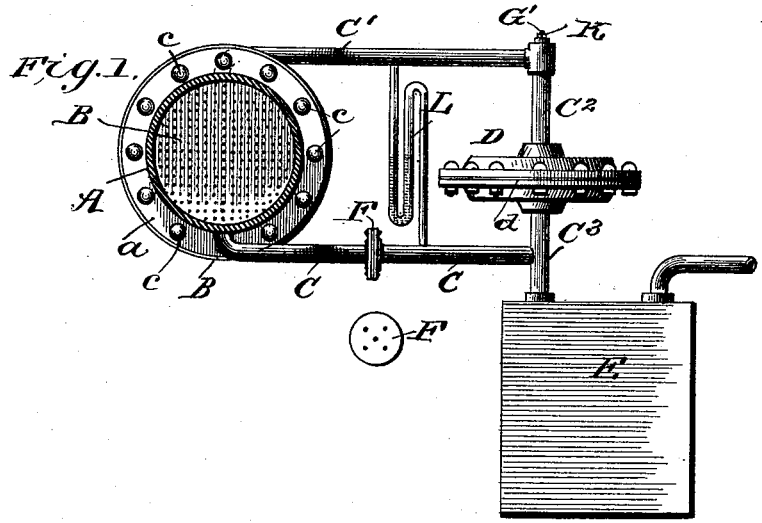
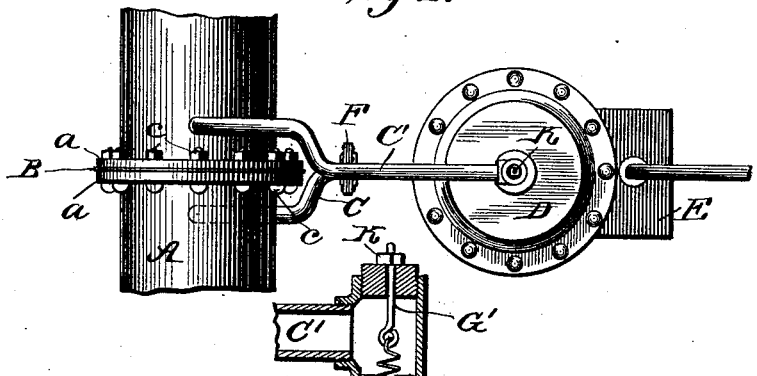
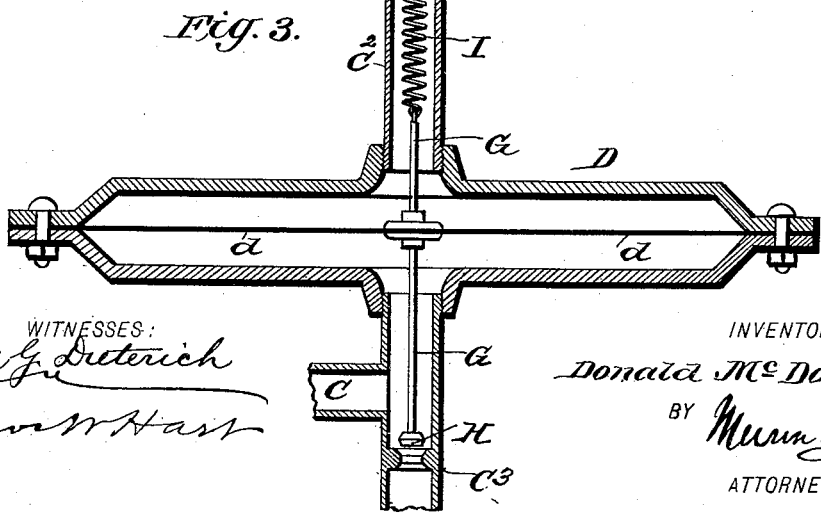
WITNESSES:
Fred G. Dieterich
Amos W. Hart
INVENTOR:
Donald McDonald.
BY Munn & Co.
ATTORNEYS

UNITED STATES PATENT OFFICE.

DONALD McDONALD, OF LOUISVILLE, KENTUCKY.

PROPORTIONAL FLUID-METER.

SPECIFICATION forming part of Letters Patent No. 475,596, dated May 24, 1892.

Application filed February 18, 1892. Serial No. 422,043. (No model.)

*To all whom it may concern:*

Be it known that I, DONALD MCDONALD, a citizen of the United States, residing at Louisville, in the county of Jefferson and State of Kentucky, have invented certain new and useful Improvements in Proportional Fluid-Meters, of which the following is a specification.

My invention is an improvement in that class of meters which are employed for measuring a small stream of fluid directed for that purpose from the main current flowing in the service-pipe or other conductor. Such meters have usually been so constructed that their action and accuracy depend on some means by which the passages of both the main and smaller streams are alternately contracted or enlarged, according to the variation of fluid-pressure. In my meter both the main conductor and the small conductor that leads off to the meter are provided with partitions or diaphragms having perforations through which the fluid passes. The number of perforations in these diaphragms is proportioned as the diameters of the respective large and small passages—that is to say, as the diameters of the service-pipe and the smaller pipe that leads therefrom to the meter. In passing through these differential diaphragms the current necessarily loses some degree of velocity, and hence the pressure is constantly greater on the side from which the fluid comes. It is essential, however, that the reduced pressure on the other side of both diaphragms in the service-pipe and smaller or meter pipe shall be kept practically the same, and to this end a pressure-regulator and liquid-gage are interposed between and connected with the said meter-pipe and another pipe of like diameter, which latter leads off from the service-pipe on the outflow side of its diaphragm.

The details of construction and operation of parts are as hereinafter described with reference to the accompanying drawings, in which—

Figure 1 is a side view of the apparatus connected with an ordinary meter and a gas or other fluid conducting pipe. Fig. 2 is a top plan view of the same parts, and Fig. 3 is an enlarged vertical section of the governor forming part of the proportional meter.

While my meter is adapted for measuring water or other liquids as well as gas, I shall, for sake of convenience, hereinafter describe it as a "gas-meter."

A indicates a portion of a gas-conducting pipe, arranged horizontally, and composed of two parts having terminal radial flanges $a$, which are bolted together. A perforated diaphragm B is placed between said flanges and secured by the same bolts $c$ as the latter. This diaphragm B, Figs. 1 and 2, is a thin metal disk of even thickness and having a certain number of perforations. Two small lateral gas-pipes C and C' are attached to the main pipe on opposite sides of said diaphragm B, the pipe C being applied on what is termed the "high" side of the diaphragm and the other pipe C' on the "low" side of the same. The terms "high" and "low" as thus applied have reference to difference of gas-pressure, the high side of the diaphragm being that nearest the source of gas supply and where the pressure is consequently greater, while the low side is that which is farthest from the source of supply and where the gas-pressure is consequently less. A diaphragm gas-governor D is interposed between the outer ends of the smaller gas-pipes C and C' and connected therewith by means of vertical and aligned branch pipes $C^2$ $C^3$, which are attached to the governor-casing on its upper and lower sides, respectively. The branch pipe $C^3$ is extended and connected with a meter E, which may be of any standard or suitable type.

The pipe C, applied on the high side of the diaphragm B of the main gas-pipe, is divided and flanged like the latter, and a small perforated disk diaphragm F is interposed between the flanges and secured by bolts in the same manner. This small diaphragm F has the same thickness as the larger one B and is provided with a definite number of holes, one or more. The said holes are preferably of the same size and form as those of the larger diaphragm B, so that under equal pressure the same quantity of gas will pass through each hole in the one as in the other in a given time, and hence the quantities of gas passing through the two diaphrams will always bear a uniform proportion to each other. The gas entering the pipe C on the high side of the diaphragm B passes through the meter E, but acts intermediately on the diaphragm $d$ of the governor D.

A rod G is attached to the rubber diaphragm $d$ and carries at its lower end a conical valve H, which seats downward in the branch $C^3$, and hence controls access of gas to the meter. The upper end of the said rod G is connected by a coil-spring I with the second rod G', which passes through a plug or stuffing-box in the upper end of the branch $C^2$ and is screw-threaded to provide for application of a nut K, that serves to adjust the rod-valve H higher or lower. In other words, the nut K and rod G' serve to regulate the tension of the spring I, so that it supports the valve H a correspondingly greater or less distance above its seat, and thus permits the gas to flow more or less freely through the meter.

A pressure-gage L is applied as shown in Fig. 1. It consists of a reversely-curved glass tube arranged vertically and partly filled with water, its ends being connected with the respective branch pipes C C'. Thus one end of the U column of water is acted on by gas from the low side of the larger diaphragm B, while the other is subject to gas-pressure from the low side of the smaller diaphragm. When the water stands at the same level in the two adjacent portions of the gage, it indicates that the pressures are equal or balance each other, and contrariwise when the two parts of the water column are at different heights it is manifest the said pressures are unequal and that the tension of the spring I requires adjustment to enable the valve H to regulate the gas-pressure and reduce it to uniformity on the low sides of both diaphragms. These pressures are always less than on the side of the diaphragm B from which the gas comes.

To further explain the operation of the meter, I will state that all the gas flowing through the larger diaphragm B, save a small portion which is diverted into the lateral pipe C, flows to the meter E through a small diaphragm F. The smaller stream of gas acts intermediately on the gage L and the diaphragm-governor D, both of which are similarly acted upon by gas in the other lateral pipe C'. The tension of the spring connected with the governor-valve H is adjusted to regulate the flow of gas, so that the pressure is kept practically the same on both sides of the diaphragm $d$ of the governor D. The gage L indicates unerringly whether the governor D is acting in a manner to effect this result.

I will further state that while I prefer I do not necessarily restrict myself to the use of perforations of the same size and form in the respective diaphragms B and F, since variations in these particulars may be made and yet the same result be attained. Thus by the preferred and above-described construction if the larger diaphragm B have five hundred holes and the smaller one F have five holes of the same size and form in both cases, then the pressure being the same on both diaphragms, one hundred times the number of cubic feet of gas will pass the one B as the other F in the same space of time. On the other hand, allowing the holes in the larger diaphragm B to remain the same as before in number, size, and form, it is manifest that by lessening the number and increasing the size of the perforations in the smaller diaphragms F, or vice versa, increasing the number and decreasing the size, the same result may be obtained—i. e., the proportion of feet of gas passing through diaphragms will be the same as before. The maintenance of this ratio is essential to accurate measure by the meter, as is also the action of the governor D.

Having thus described my invention, what I claim, and desire to secure by Letters Patent, is—

1. In a proportional gas-meter, the combination, with the meter proper and the main gas-conductor A, of the perforated diaphragm B, fixed in the latter, the lateral conductors C and C', leading off from such main conductor on opposite sides of its diaphragm, the smaller diaphragm F, fixed in the lateral conductor C, said diaphragms having perforations that correspond in size but differ in number, and a gas-regulator proper connected with the lateral conductors C C', as shown and described.

2. In a proportional fluid-meter, the combination, with the meter proper, the main conductor, the lateral conductors C and C', and the proportional diaphragms located as specified, of the governor having a flexible diaphragm and a valve connected therewith, and the liquid-gage connected at its respective ends with the said laterals, all substantially as shown, and for the purposes described.

3. In a proportional fluid-meter, the combination, with the meter, the main and lateral conductors, and differential perforated diaphragms, of the valve H, the rod connected with the latter and the governor-diaphragm, the spring I, and the rod G', and adjusting-nut K, all arranged as shown and described, and for the purposes specified.

DONALD McDONALD.

Witnesses:
    THOS. W. KENNEDY,
    R. T. DUVRETT.